US008657161B2

(12) United States Patent
Tavolazzi

(10) Patent No.: US 8,657,161 B2
(45) Date of Patent: Feb. 25, 2014

(54) BEVERAGES DISPENSER AND A METHOD FOR DISPENSING BEVERAGES

(75) Inventor: Stefano Tavolazzi, Verbania_Intra (IT)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 13/523,122

(22) Filed: Jun. 14, 2012

(65) Prior Publication Data

US 2013/0015199 A1 Jan. 17, 2013

(30) Foreign Application Priority Data

Jul. 12, 2011 (EP) .................................... 11173634

(51) Int. Cl.

| | |
|---|---|
| ***B65D 88/54*** | (2006.01) |
| ***G01F 11/00*** | (2006.01) |
| ***B67D 7/80*** | (2010.01) |
| ***B67D 1/00*** | (2006.01) |
| ***B67D 7/14*** | (2010.01) |
| ***B67B 7/00*** | (2006.01) |
| ***B67D 1/16*** | (2006.01) |
| ***F16K 21/18*** | (2006.01) |
| ***F16K 31/20*** | (2006.01) |
| ***B65B 1/04*** | (2006.01) |
| ***B65B 3/04*** | (2006.01) |
| ***B67C 3/02*** | (2006.01) |

(52) U.S. Cl.

USPC .............. 222/318; 222/146.1; 222/64; 222/1; 222/108; 222/109; 137/386; 137/391; 141/115; 141/116; 141/120

(58) Field of Classification Search

USPC ......... 222/146.1, 571, 1, 146.6, 64, 108, 109, 222/318; 141/115, 116, 120, 311 A; 137/239, 386, 391; 239/119

See application file for complete search history.

(56) References Cited

U.S. PATENT DOCUMENTS

| | | | | | |
|---|---|---|---|---|---|
| 2,434,771 | A * | 1/1948 | Klein et al. | .................. | 222/318 |
| 2,950,607 | A * | 8/1960 | Fries, Jr. | ...................... | 62/324.3 |
| 3,730,500 | A * | 5/1973 | Richards | .................... | 261/140.1 |
| 4,905,871 | A * | 3/1990 | Dutertre | .......................... | 222/83 |
| 5,906,296 | A * | 5/1999 | Martindale et al. | ........... | 222/108 |
| 7,665,639 | B2 * | 2/2010 | Kamikozuru | ................ | 222/627 |
| 2008/0226521 | A1 * | 9/2008 | Nakano et al. | ................ | 422/307 |

FOREIGN PATENT DOCUMENTS

| | | | |
|---|---|---|---|
| DE | 4228770 | A1 * | 3/1994 |
| EP | 1148023 | A1 | 10/2001 |
| GB | 2307975 | A | 6/1997 |

* cited by examiner

*Primary Examiner* — Paul R Durand
*Assistant Examiner* — Benjamin R Shaw

(57) ABSTRACT

A beverages dispenser, particularly for carbonated beverages, comprises a cooled tank where beverage is stored, an inlet pipe to the tank, an inlet valve on the inlet pipe, a pump downstream the inlet valve for feeding a beverage to the tank in order to maintain a predetermined level wherein, an outlet pipe from the tank to a beverage dispensing nozzle, and an outlet valve on the outlet conduit. An auxiliary pipe is disposed between the inlet pipe downstream the inlet valve and the outlet pipe downstream the outlet valve and a control unit is adapted to close the inlet valve and to run the pump in order to empty the outlet pipe into the tank after the beverage is dispensed in order to prevent dripping.

12 Claims, 2 Drawing Sheets

BEVERAGES DISPENSER AND A METHOD FOR DISPENSING BEVERAGES

BACKGROUND OF THE INVENTION

The present invention relates to a beverage dispenser, particularly for carbonated beverages, comprising at least a cooled tank where a beverage is stored, an inlet conduit to the tank, an inlet valve on the inlet conduit, a pump downstream the inlet valve for feeding beverage to the tank in order to maintain a predetermined level therein, an outlet conduit from the tank to a beverage dispensing nozzle and an outlet valve on the outlet conduit.

SUMMARY OF THE INVENTION

With the term "beverage dispenser" we mean every system for dispensing beverages either included in a refrigerator appliance or installed within a piece of furniture in a kitchen (for instance a sink). Moreover, with the term "beverage" we mean any liquid which can be dispensed by the beverages dispenser, including still or sparkling water, soft drinks carbonated or not carbonated, fruit juices etc.

Today the standalone beverages dispensers as well as beverages dispensers on refrigerators dispense carbonated and not carbonated beverages at the touch of a button. The user, by pressing a dispensing button on a user interface of the dispenser, activates solenoid valve devices which are located inside the unit. These valve devices are usually quite far from the dispenser nozzle, usually under the sink or in the back side of the refrigerator.

With such known solutions a solenoid valve inside the unit closes the outlet line to the dispenser nozzle anytime the dispensing button is released. The drawback is that the system closed the outlet conduit or pipe by means of a valve, but in the pipe itself there's still some beverage or water which can escape to the outlet dispensing nozzle. This drawback is even worse if the dispensed beverage is a carbonated type beverage, for instance carbonated water. In this case the dripping occurs because carbon dioxide dissolved into the beverage tries to escape in the atmosphere, so pushing liquid to the dispenser nozzle. The amount of liquid dripping is a function of the level of carbonation, the higher the carbonation level the longer the dripping.

It is therefore an object of the present invention to provide a beverage dispenser of the type mentioned at the beginning of the description which does not present the drawbacks of the known solutions, and which is simple, reliable and has a low cost.

According to the invention, this object is reached thanks to the features listed in the appended claims. One of the main advantages of the invention is related to the pump, which is already installed into the unit to fill the tank, is also used to avoid the dripping without any major modification to the dispenser outlet which is usually located far from the unit, either on the sink or on the counter in the kitchen or refrigerator door location. By adding an auxiliary conduit placed between the inlet conduit downstream the inlet valve and the outlet conduit downstream the outlet valve, by closing the inlet valve, is the pump may be switched on and used to empty the outlet conduit by delivering the beverage still contained in such conduit (after beverage dispensing) into the cooled tank.

BRIEF DESCRIPTION OF THE DRAWINGS

Further advantages and features of a beverage dispenser according to the present invention will be clear from the following detailed description, provided as non limiting example, with reference to the attached drawings in which.

DETAILED DESCRIPTION

Figure 1:
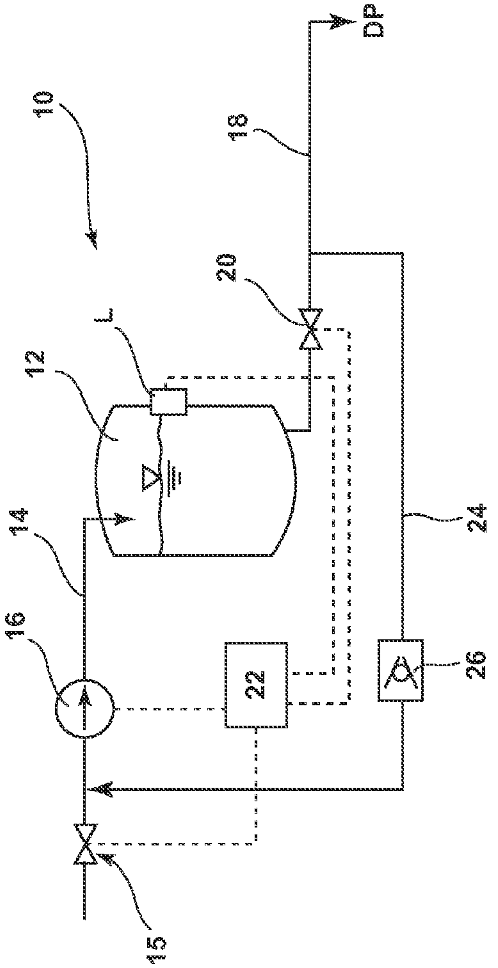
FIG. 1 is a schematic view of a carbonated water dispenser according to a first embodiment of the invention.

With reference to FIG. 1, a beverage dispenser 10 comprises a cooled tank 12, an inlet conduit 14 connected through a solenoid inlet valve 15 to an hydraulic circuit (water) or to an external storage tank (beverages) and a pump 16 on the inlet conduit 14. On the beverage dispensing side the dispenser 10 comprises an outlet conduit 18 on which a solenoid valve 20 is placed. The pump 16, the inlet valve 15 and the outlet valve, together with a level sensor L inside the tank 12 are connected to a control unit 22 of the dispenser to which an user interface (not shown) is also connected.

According to the invention, between the inlet conduit 14, downstream the inlet valve 15, and the outlet conduit 18, downstream the outlet valve 20, an auxiliary conduit 24 is placed, on which a check valve 26 is installed in order to prevent liquid flow from the inlet conduit 14 to the outlet conduit 18.

Figure 2:
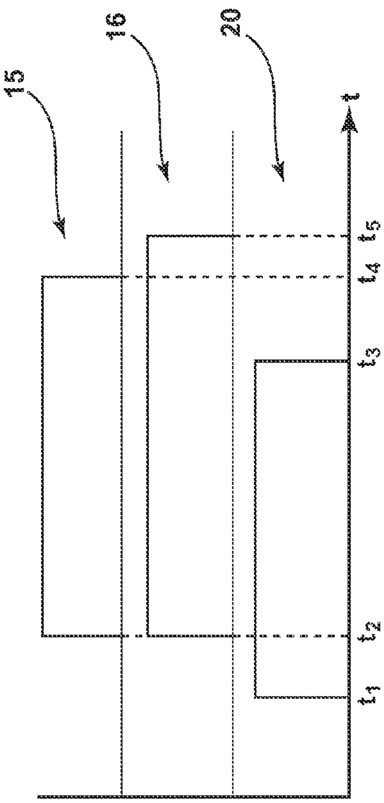
FIG. 2 is a diagram showing the behavior of the solenoid valves and pump of the beverage dispenser shown in FIG. 1.

In FIG. 2 it is shown the behavior vs. time of the two solenoid valves 15 and 20 and of the pump 16. In the bottom part of FIG. 2, at time t1, when the user demands the delivery of cooled water from the tank 12, the outlet valve 20 opens. At time t2, when the level sensor sends a low level signal to the control unit 22, the pump 16 is switched on together with the inlet valve 15 from the hydraulic system or from a beverage external reservoir. At time t3 the user, through the user interface, closes the outlet valve 20. After time t3, the pump 16 may continue running (as shown in FIG. 2) in order to fill the tank 12 at the set value, while the inlet valve 15 is maintained in an open configuration. At time t4 the level in the tank 12 has reached the set value and therefore the inlet valve 15 is closed. At time t4 the pump 16 is not switched off and is kept running for few seconds (up to time t5) in order to completely empty the outlet conduit 18 by sucking the liquid through the auxiliary conduit 24 to the tank 12. The effect is that with a empty outlet conduit 18, there is no risk of dripping from the nozzle of the dispensing system.

Figure 3:
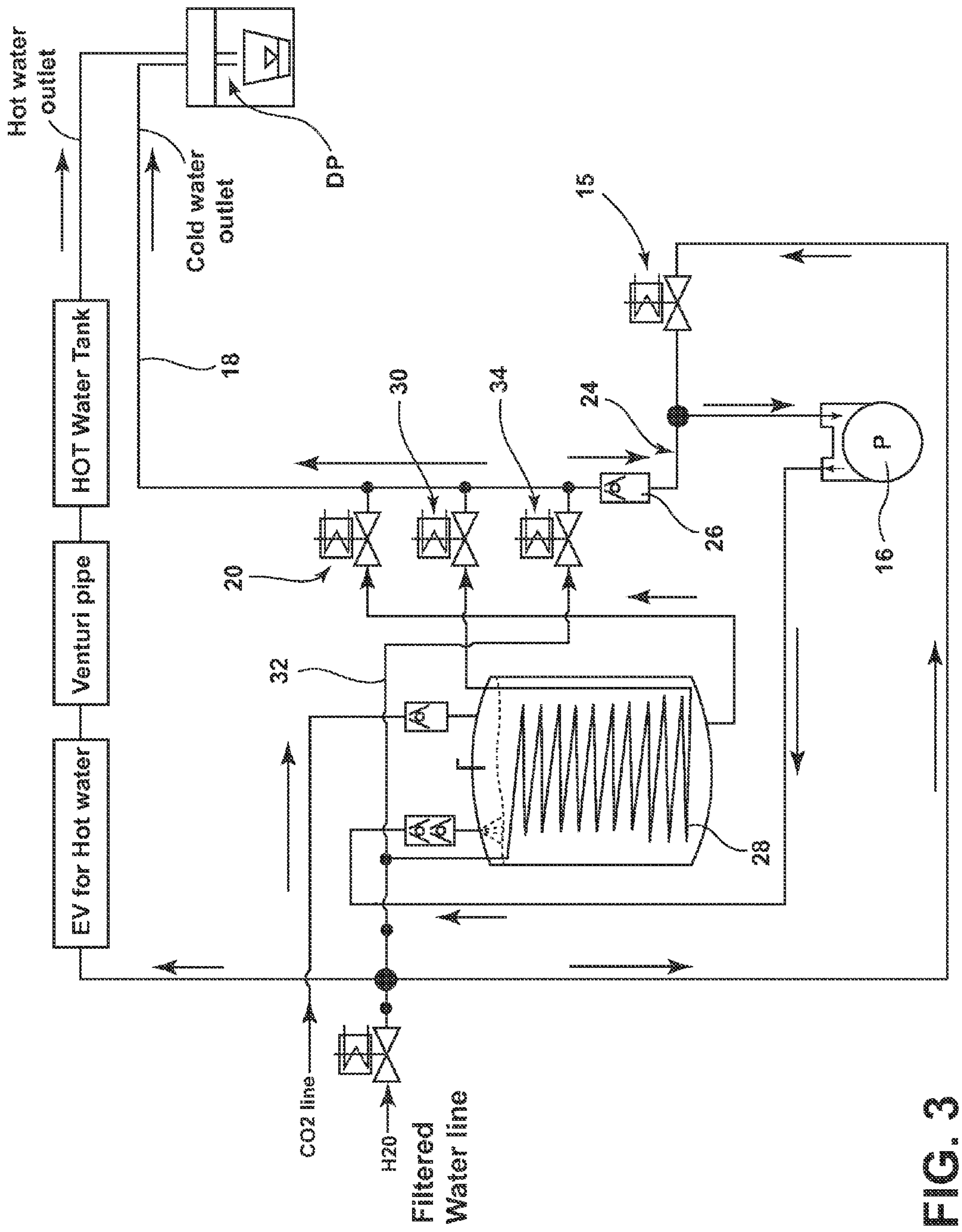
FIG. 3 is a schematic view of a beverage dispenser according to a second embodiment of the invention.

With reference to FIG. 3 (in which the same reference numerals of FIG. 1 have been used for indicating identical or similar elements), it is shown a dispensing system 10 which provides different type of beverages to a dispensing point DP by means of two pipes, one for cold and one for hot beverages.

When carbonated beverage dispensing is requested by the user, the outlet valve 20 opens and the liquid flows to the dispensing point or nozzle DP. When the valve 20, which is activated by the user through a button on the user interface, closes, some amount of liquid remains into the outlet conduit 18 from the outlet valve 20 to the dispensing point DP, so the inlet valve closes and the pump 16 starts sucking the liquid contained in the outlet conduit 18 dispenser pipe and injecting it into the tank 12 to prepare the carbonated beverage. Due to the small amount of liquid inside the outlet conduit 18 this operation lasts only few seconds; after the outlet conduit 18 has been emptied, the inlet valve 15 opens to allow the refill of the tank trough the main filtered water line from the tap.

The refill is based on the water level sensor L of the standard unit. Check valve 26 avoids water flow from the main water line to the dispenser while the tank 12 is refilling.

In the embodiment of FIG. 3 the refrigerated tank 12 contains a serpentine pipe 28 which is used for delivery still cooled water through a first auxiliary solenoid outlet valve 30. In a similar way, the dispensing system according to FIG. 3 shows also a tap water conduit 32 which delivers tap water trough a second auxiliary solenoid outlet valve 34. The methodology for emptying the outlet conduit 18 is used for still cold water and for tap water as well, even if the problem of dripping is mainly for carbonated beverages.

The invention claimed is:

1. Beverage dispenser, for carbonated beverages, comprising at least a cooled tank where beverage is stored, an inlet conduit to the tank, an inlet valve on the inlet conduit, a pump downstream the inlet valve for feeding a beverage to the tank, an outlet conduit from the tank to a beverage dispensing nozzle, and an outlet valve on the outlet conduit, said beverage dispenser comprising:

an auxiliary conduit disposed between the inlet conduit downstream the inlet valve and the outlet conduit downstream the outlet valve; and a control unit adapted to close the inlet valve and to run the pump in order to empty the outlet conduit into the tank after the beverage is dispensed.

2. Beverage dispenser according to claim 1, wherein the auxiliary conduit comprises a check valve preventing the flow of beverage from the inlet conduit to the outlet conduit.

3. Beverage dispenser according to claim 1, wherein the tank is adapted to contain carbonated water and is provided with a conduit contained therein for feeding cooled water to the dispensing nozzle by means of a second outlet valve on an auxiliary outlet conduit connected to said outlet conduit.

4. Beverage dispenser according to claim 3, wherein between the inlet conduit and the outlet conduit a by-pass conduit is installed for delivering still water from a tap water conduit to the dispensing nozzle.

5. Beverage dispenser according to claim 1, wherein the beverage dispensing system comprises a second outlet conduit connected to an auxiliary tank for hot water.

6. An apparatus for dispensing beverages comprising:

a tank, wherein the tank is thermally connected to a cooling source;

an inlet valve;

an inlet conduit, wherein the inlet conduit is in adapted to provide fluid to the tank and the flow of fluid within the inlet conduit is affected by the inlet valve;

a pump operatively connected to the fluid flow of the apparatus and downstream of the inlet valve;

an outlet valve;

an outlet conduit, wherein the outlet conduit is in fluidic contact with the tank and the flow of fluid within the outlet conduit is affected by the outlet valve;

an auxiliary conduit located between the inlet conduit and the outlet conduit; and a control unit, wherein the control unit effectively drives the closing of the inlet valve and wherein the control unit effectively drives the operation of the pump, wherein the operation of the pump drives the emptying of the outlet conduit into the tank at the end of the beverage dispensing.

7. The apparatus of claim 6 wherein the cooling source is cold air.

8. The apparatus of claim 6 wherein the control unit includes a button that a user may activate.

9. The apparatus of claim 6 wherein the control unit is further adapted to detect a low level of fluid in the tank, and in response to a low level detection, the control unit ensures that the pump is operating and opens the inlet valve.

10. The apparatus of claim 6 wherein the control unit is further adapted to detect a targeted level of fluid in the tank, and in response to the targeted level detection, the control unit closes the inlet valve.

11. The apparatus of claim 6 wherein the auxiliary conduit comprises a check valve preventing the flow of beverage from the inlet conduit to the outlet conduit.

12. The apparatus of claim 6 wherein the auxiliary conduit flows fluid into the tank to prevent the flow of beverage from the outlet conduit following dispensing of the fluid.

* * * * *